(12) United States Patent
Tohzaka et al.

(10) Patent No.: US 10,334,501 B2
(45) Date of Patent: Jun. 25, 2019

(54) WIRELESS COMMUNICATION SYSTEM AND WIRELESS COMMUNICATION METHOD

(71) Applicant: Kabushiki Kaisha Toshiba, Minato-ku (JP)

(72) Inventors: Yuji Tohzaka, Kawasaki (JP); Hiroki Kudo, Kawasaki (JP); Ren Sakata, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/692,691

(22) Filed: Aug. 31, 2017

(65) Prior Publication Data

US 2018/0270733 A1    Sep. 20, 2018

(30) Foreign Application Priority Data

Mar. 17, 2017  (JP) .................................. 2017-053465

(51) Int. Cl.
*H04W 40/12*    (2009.01)
*H04W 72/04*    (2009.01)
(Continued)

(52) U.S. Cl.
CPC .......... *H04W 40/125* (2013.01); *H04L 45/20* (2013.01); *H04W 40/02* (2013.01); *H04W 72/04* (2013.01);
(Continued)

(58) Field of Classification Search
CPC .. H04B 7/2125; H04B 7/2656; H04B 7/2121; H04B 7/15; H04W 84/18; H04W 72/121;
(Continued)

(56) References Cited

U.S. PATENT DOCUMENTS 10,080,187 B2 *   9/2018  Sakata .................. H04B 7/2121
2003/0058826 A1 *  3/2003  Shearer, III ........... H04W 74/02
                                                            370/338

(Continued)

FOREIGN PATENT DOCUMENTS

JP    2008228180 A  *  9/2008
JP    2009-94896        4/2009
(Continued)

*Primary Examiner* — Ahmed Elallam
(74) *Attorney, Agent, or Firm* — Oblon, McClelland, Maier & Neustadt, L.L.P.

(57) ABSTRACT

In a first subframe determined from a first number of hops up to a concentrator and being among a plurality of subframes included in a first frame period, a first wireless communication apparatus transmits first data, a second wireless communication apparatus transmits second data, and a third wireless communication apparatus receives the second data. In a second subframe determined from a second number of hops different from the first number of hops up to the concentrator and not corresponding to the first subframe among a plurality of subframes included in a second frame period following after the first frame period, the third wireless communication apparatus transmits the second data, and the third wireless communication apparatus does not transmit the second data in the first frame period.

18 Claims, 18 Drawing Sheets

(51) Int. Cl.
*H04W 74/04* (2009.01)
*H04W 28/10* (2009.01)
*H04W 28/26* (2009.01)
*H04L 12/733* (2013.01)
*H04W 40/02* (2009.01)
*H04W 72/12* (2009.01)
*H04B 7/15* (2006.01)
*H04W 84/18* (2009.01)
*H04B 7/26* (2006.01)

(52) U.S. Cl.
CPC .............. *H04B 7/15* (2013.01); *H04B 7/2606* (2013.01); *H04W 72/121* (2013.01); *H04W 84/18* (2013.01); *Y02D 70/00* (2018.01); *Y02D 70/22* (2018.01); *Y02D 70/30* (2018.01); *Y02D 70/34* (2018.01)

(58) Field of Classification Search
CPC ...... Y02D 70/22; Y02D 70/446; Y02D 70/00; H04L 45/20
See application file for complete search history.

(56) References Cited

U.S. PATENT DOCUMENTS

| | | | |
|---|---|---|---|
| 2008/0165797 A1* | 7/2008 | Aceves | H04L 47/10 370/458 |
| 2008/0267159 A1* | 10/2008 | Mattsson | G08B 25/01 370/345 |
| 2010/0290379 A1* | 11/2010 | Bahk | H04W 52/0216 370/311 |
| 2011/0038252 A1* | 2/2011 | Chung | H04W 74/04 370/216 |
| 2011/0051645 A1* | 3/2011 | Hong | H04L 45/48 370/311 |
| 2012/0201193 A1* | 8/2012 | Sugiyama | H04B 7/155 370/315 |
| 2013/0070646 A1* | 3/2013 | Myers | H04W 84/18 370/255 |
| 2016/0066319 A1 | 3/2016 | Sakata et al. | |
| 2016/0212729 A1* | 7/2016 | Bulten | H04W 72/048 |
| 2017/0013577 A1* | 1/2017 | Berggren | H04B 7/2656 |

FOREIGN PATENT DOCUMENTS

| | | | |
|---|---|---|---|
| JP | 2009094896 A | * | 4/2009 |
| JP | 2016-54349 | | 4/2016 |

* cited by examiner

WIRELESS COMMUNICATION SYSTEM AND WIRELESS COMMUNICATION METHOD

CROSS REFERENCE TO RELATED APPLICATION(S)

This application is based upon and claims the benefit of priority from the prior Japanese Patent Application No. 2017-053465, filed on Mar. 17, 2017, the entire contents of which are incorporated herein by reference.

FIELD

Embodiments relate generally to a wireless communication system and a wireless communication method.

BACKGROUND

Conventionally, wireless mesh networks in which a plurality of wireless nodes are connected in a mesh pattern is used. As a communication system of such wireless mesh networks, for example, a time-division communication system is used.

In the time-division communication system, because timing at which each wireless node is caused to be in a sleeping state can be easily controlled, power saving for the wireless mesh network can be achieved. In addition, by allocating an early time within a transmission period to a transmission time of a wireless node having a large number of hops, smooth relay transmission is achieved.

However, such the conventional wireless mesh network has an upper limit value of the number of hops to which the transmission time can be allocated within a transmission period.

And thus the conventional mesh wireless network has a limit on an area size for the network to be able to cover.

DESCRIPTION OF EMBODIMENTS

According to one embodiment, a wireless communication system which includes a concentrator and a plurality of wireless communication apparatuses is provided.

The plurality of wireless communication apparatuses includes a first wireless communication apparatus having a first number of hops up to the concentrator, a second wireless communication apparatus having a second number of hops different from the first number of hops up to the concentrator, and a third wireless communication apparatus having a third number of hops different from the first number of hops and the second number of hops up to the concentrator. In a first subframe determined from the first number of hops and being among a plurality of subframes included in a first frame period, the first wireless communication apparatus transmits first data, the second wireless communication apparatus transmits second data, and the third wireless communication apparatus receives the second data. In a second subframe determined from the second number of hops and not corresponding to the first subframe among a plurality of subframes included in a second frame period following after the first frame period, the third wireless communication apparatus transmits the second data, and the third wireless communication apparatus does not transmit the second data in the first frame period.

Hereinafter, embodiments of the present invention will be described with reference to the drawings.

First Embodiment

<System Configuration>

Figure 1:
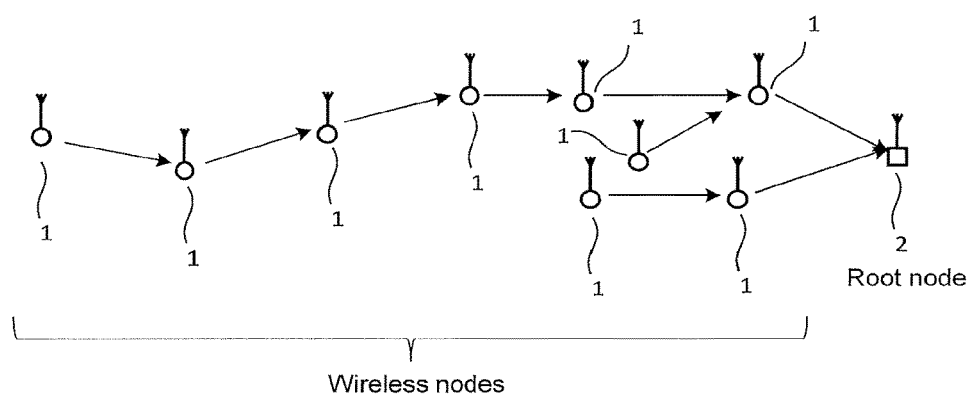
FIG. 1 is a diagram illustrating an example of the configuration of a wireless communication system.

FIG. 1 is a diagram illustrating an example of the configuration of a wireless communication system according to this embodiment. As illustrated in FIG. 1, this wireless communication system includes a plurality of wireless communication apparatuses 1 and a concentrator 2. The wireless communication system configures a wireless mesh network or a wireless multi hop network having the wireless communication apparatuses 1 as wireless nodes and the concentrator 2 as a root node and performs communication using a time-division communication system.

In this wireless communication system, the wireless communication apparatuses 1 arranged in a predetermined range and the concentrator 2 can communicate with each other through wireless communication. The wireless communication apparatus 1, for example, may mount an arbitrary sensor such as a temperature sensor or an acceleration sensor and wirelessly transmit measurement information acquired by the sensor. Information (data) transmitted by each wireless communication apparatus 1 is transmitted to the concentrator 2 through other wireless communication apparatuses 1 or directly. The concentrator collects information transmitted from each wireless communication apparatus 1. The transmission of information from the wireless communication apparatus 1 to the concentrator 2 performed in this protocol is so called uplink communication. The concentrator 2, for example, is a server having a wireless communication function. Not illustrated in the drawing, but the concentrator 2 may be connected to another server in a wired or wireless protocol and collected information may be transmitted to this server.

Figure 2:
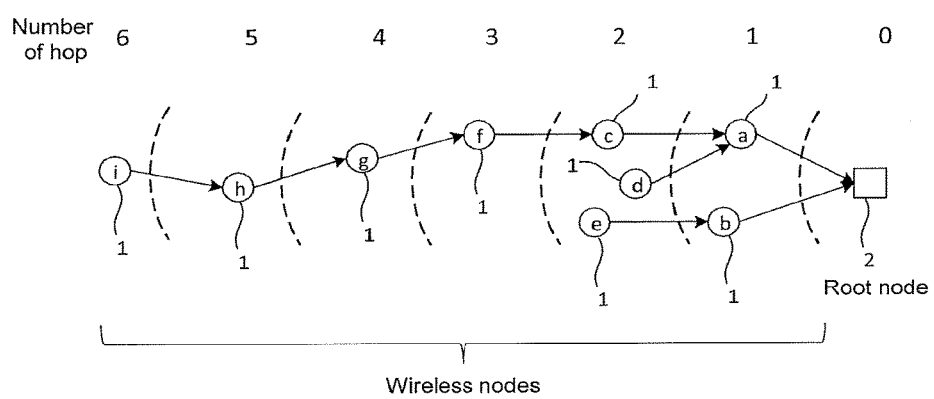
FIG. 2 is a schematic diagram of a network topology illustrating a wireless communication system.

FIG. 2 is a schematic diagram of a network topology illustrating the wireless communication system illustrated in FIG. 1. In FIG. 2, an alphabet represents each wireless node (wireless communication apparatus 1), a root represents a root node (concentrator 2), and an arrow represents a transmission path of information in uplink communication. The start point of the arrow represents a transmission source of information, and the end point of the arrow represents a destination of information to be transmitted.

In description presented below, each wireless communication apparatus 1 will be referred to as a wireless node x, and a concentrator 2 will be referred to as a root node. x corresponds to an alphabet illustrated in the drawing. Until information is transmitted by the wireless node x and is received by the root node, the number of times of transmission performed by the wireless node x and other wireless nodes will be referred to as the number of hops of the wireless node x. The number of hops of the root node is zero. A more closer side to the root node than the wireless node x (i.e. a side having a smaller number of hops to the root node) will be referred to as an upstream side, and a more farther side from the root node than the wireless node x (i.e. a side having a larger number of hops to the root node) will be referred to as a downstream side. In addition, among the wireless nodes and the root node transmitting/receiving information to/from the wireless node x, a wireless node installed on the upstream side or the root node will be referred to as a parent node and a wireless node installed on the downstream side will be referred to as a child node. For example, in the case illustrated in FIG. 2, a parent node of a wireless node is a root node, and child nodes thereof are wireless nodes "c" and "d".

The transmission of information received by the wireless node x from a child node (parent node) to a parent node (child node) is referred to as a relay. When a relay is performed, it may be possible that information of the wireless node x is added to the received information in the transmission. In this embodiment, while an uplink communication in which information is transmitted from a downstream side to a upstream side will be described, a downlink communication can also be applied.

<Configuration of Time Frame>

Figure 3:
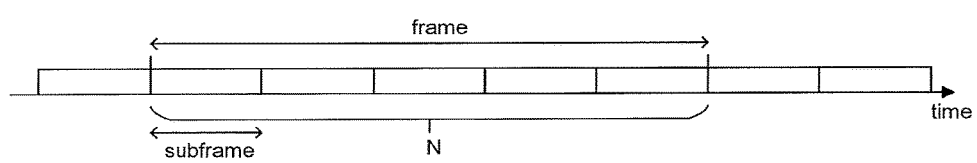
FIG. 3 is a diagram illustrating the configuration of a time frame.

FIG. 3 is a diagram illustrating a time-division communication system. In the time-division communication system, an operating time corresponding to one cycle of the wireless communication system is preset. This operating time will be referred to as a frame (period). This wireless communication system may repeat an operation of one cycle.

Each of plural frames includes N subframes. Here, N is a positive value of a natural number larger than "1". The subframe is the operating time of one or a plurality of wireless nodes. A wireless node, for example, transmits information to a parent node in an allocated subframe. In addition, a subframe which is not allocated for each wireless node as an operating time may be included in the frame. Furthermore, for example, a time slot may be defined as a time unit smaller than a subframe, and the subframe may be configured by a predetermined number of time slots. This embodiment also relates to a method of allocating a transmission subframe of each wireless node, and details thereof will be described later.

<Configuration of Concentrator>

Figure 4:
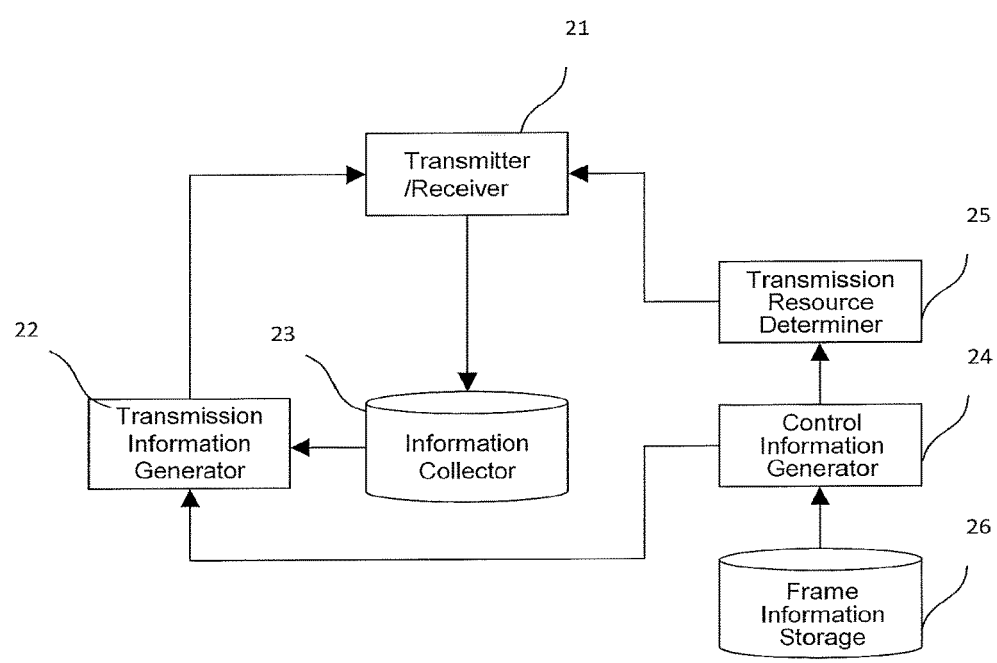
FIG. 4 is a diagram illustrating the configuration of a concentrator.

The configuration of the concentrator configuring the wireless communication system according to this embodiment will be described with reference to FIG. 4. The wireless communication apparatus 1 of the wireless communication system transmits a signal that is a reference for measuring communication timing, and the concentrator 2 according to this embodiment collects information transmitted from the wireless communication apparatus 1. FIG. 4 is a diagram illustrating the configuration of the concentrator 2.

The concentrator 2 includes a transmitter/receiver 21, a transmission information generator 22, an information collector 23, a control information generator 24, a transmission resource determiner 25, and a frame information storage 26.

The transmitter/receiver 21 performs predetermined signal processing for an electric signal generated from a wireless signal and extracting reception information, thereby receiving the wireless signal.

The transmitter/receiver 21 may include a transmitter/receiver antenna which is capable of transmitting or receiving wireless signals. The antenna converts a received wireless signal into an electric signal and converts an electric signal generated by the transmitter/receiver into a wireless signal and transmits the converted wireless signal. The reception information may include at least the number of hops, sensor information, a node ID, and relay information of a transmission source node and a node ID of a destination node. The node ID is an identifier of each wireless communication apparatus 1 configuring the wireless communication system. The relay information is information of the other wireless node which was relayed by the transmission source node. The destination node is a wireless node or a root node that is a destination to which the transmission source node transmits information. The signal processing includes the process of an AD conversion, decoding according to a predetermined communication protocol, and the like.

In addition, the transmitter/receiver 21 performs predetermined signal processing for transmission information generated by the transmission information generator 22, converts the processed transmission information into an electric signal, and transmits the electric signal. The transmission information may include the number of hops, frame information, time information, a node ID, and acknowledgement response information of the own node. The frame information, as described above, is setting information of a frame, a subframe, and the like of the wireless communication system. The time information may be a standard time or may be a frame number counted up with a unit of frame from starting of the operation of the wireless communication system. The time information may include a subframe number in the frame or information of an elapsed time from a head of the subframe until starting of transmission, and may include similar information relating to a unit defined in a shorter time than the subframe. The signal processing includes the process of a DA conversion, encoding according to a predetermined communication protocol, and the like.

The information collector 23 stores reception information received by the transmitter/receiver 21. A data format at the time of storage may be any arbitrary format.

The control information generator 24, based on frame information stored in the frame information storage 26, generates frame information and time information. In a case where time information is set to standard time, the time information may be set manually or set by using time synchronized with a network time protocol (NTP) or a precision time protocol (PTP) through another wired or wireless network (not illustrated), or, in a case a receiver with a wireless controlled clock is provided, time synchronized with the wireless controlled clock may be used.

The transmission information generator 22 generates transmission information based on the frame information and the time information generated by the control information generator 24. In addition, the transmission information generator 22, based on the reception information stored in the information collector 23, may generate acknowledgement response information and include the generated acknowledgement response information in the transmission information. The acknowledgement response information, for example, is a series in which a corresponding bit is set to each wireless node to have one-to-one correspondence in accordance with a result of reception from each wireless node for a last frame number. The transmission information generated by the transmission information generator 22 may be transmitted by the transmitter/receiver 21 to the network as illustrated in FIG. 2 or to an external network thereof.

The transmission resource determiner 25, based on the frame information generated by the control information generator 24, determines a transmission subframe to which the own node transmits the transmission information. Details thereof will be described later. In addition, in a case where a plurality of frequency channels is used, a frequency channel for transmission/reception may be selected using any method.

The frame information may be registered in the concentrator 2 in advance or may be registered and updated from the outside through another wired or wireless network. The number N of subframes is the number of subframes included in a frame. When the frame length is defined, and the number N of subframes is given, a subframe length is determined. In addition, when a subframe length is defined, and the number N of subframes is given, a frame length is determined. Furthermore, in a case where a slot length is defined as a time unit smaller than the subframe, a frame length or a subframe length may be determined based on information of the number of slots included in a subframe by using the slot length as the reference.

In addition, a plurality of frame information may be registered in advance, and switching among the frame information may be automatically performed in accordance with the operating time of the wireless communication system or the standard time, or switching among the frame information may be performed in accordance with the state of the wireless communication system. For example, a first setting may be employed at the time of starting the operation of the wireless communication system, and, when the number of wireless communication apparatuses, which is acquired through the monitoring of the collection information, participating in the wireless communication system becomes a predetermined number or more, a second setting may be employed. Practically, to set the number of subframes in the first setting more smaller than that of subframes in the second setting can make an initial network buildup time more shorter.

The number of subframes may be decreased so as to respond to expand a communication capacity if it is desired to increase sampling frequency of sensing information or granularity of sensing information. On the other hand, the number of subframes may be increased if it is desired to perform power saving as like night-time operation.

When frame information is changed by the concentrator 2, information of application start time in addition to updated frame information be necessarily included in a signal transmitted from the concentrator to notify the whole wireless communication system.

Next, the hardware configuration of the concentrator will be described with reference to FIG. 5. The concentrator 2 is configured by a computer apparatus. The computer apparatus includes a central processing unit (CPU) 104, an input interface 102, a graphic processing device 103, a communication interface 101, a main storage device 105, and an external storage device 106, and such components are interconnected through a bus.

The CPU 104 executes a wireless communication program on the main storage device. Here, the wireless communication program is a program realizing each functional configuration of the concentrator 2 described above. As the CPU 104 executes the wireless communication program, each functional configuration of the concentrator 2 can be realized.

The input interface 102 is a device which is used for inputting operation signal from an input device such as a keyboard or a mouse to the concentrator. The computer apparatus not including such input interface 102 may be also considerable.

The graphic processing device 103 is a device which makes to display picture images or video images based on picture image signals or video image signals being processed from the CPU, on a display device such as a liquid crystal display (LCD), a CRT (Braun tube), or a plasma display (PDP). However, the computer apparatus of the concentrator 2 may not necessarily include the graphic processing device.

The communication interface 101 is a device that the concentrator 2 wirelessly communicates with wireless nodes. The functional configuration of the transmitter/receiver 21 is realized through the wireless communication interface.

The main storage device 105, when the wireless communication program is executed stores a wireless communication program, data required for the execution of the wireless communication program, data generated according to the execution of the wireless communication program, and the like. The wireless communication program is expanded on the main storage device 105 and is executed. The main storage device 105, for example, is a RAM, a DRAM, or an SRAM but is not limited thereto. The main storage device 105 can store information such as the wireless communication program, relay information, frame information, a node ID, the number of hops, a parent node, a child node, and the like. In addition, the main storage device 105 may store an OS, BIOS and various kinds of middleware of the computer apparatus.

The external storage device 106 stores the wireless communication program, data required for the execution of the wireless communication program, data generated according to the execution of the wireless communication program, and the like. Such a program or data is read by the main storage device 105 when the wireless communication program is executed. The external storage device 106, for example, is a hard disk, an optical disc, a flash memory, or a magnetic tape but is not limited thereto. The external storage device 106 can store information such as the wireless communication program, relay information, frame information, a node ID, the number of hops, a parent node, a child node, and the like.

In addition, the wireless communication program may be installed to the computer apparatus in advance or may be transmitted to the concentrator 2 through another wired or wireless network and be installed to the computer apparatus.

<Configuration of Wireless Communication Apparatus>

Figure 6:
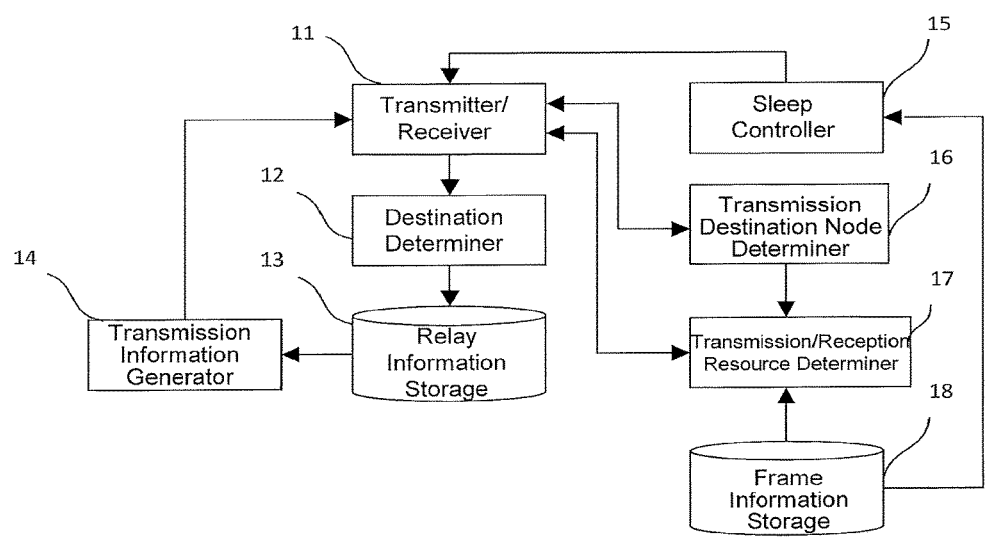
FIG. 6 is a diagram illustrating the configuration of a wireless communication apparatus.

The configuration of the wireless communication apparatus configuring the wireless communication system according to this embodiment will be described with reference to FIG. 6. The wireless communication apparatus according to this embodiment automatically realizes transmission time allocation to be described later. FIG. 6 is a diagram illustrating the configuration of the wireless communication apparatus 1.

Hereinafter, this wireless communication apparatus 1 will be referred to as an own node, a wireless node transmitting information to the own node will be referred to as a transmission source node, and a wireless node to which the own node transmits information will be referred to as a destination node.

The wireless communication apparatus 1 includes a transmitter/receiver 11, a destination determiner 12, a relay information storage 13, a transmission information generator 14, a destination node determiner 16, a transmission/reception resource determiner 17, a frame information storage 18, and a sleep controller 15.

The transmitter/receiver 11 may include a transmitter/receiver antenna. The transmitter/receiver antenna transmits or receives wireless signals. The transmitter/receiver antenna converts a received wireless signal into an electric signal and converts an electric signal to be transmitted into a wireless signal. By performing predetermined signal processing for an electric signal input from the transmitter/receiver antenna and extracting reception information from the received wireless signal, the transmitter/receiver 11 receives the reception information. The reception information may include the number of hops, sensor information, a node ID, relay information of the transmission source node, and a node ID of the destination node.

In addition, the transmitter/receiver 11 performs predetermined signal processing for the transmission information generated by the transmission information generator 14, converts the processed transmission information into an electric signal, and outputs the converted electric signal to the transmitter/receiver antenna. In this way, the transmitter/receiver 11 transmits the transmission information. The transmission information may include the number of hops, a node ID, and relay information of the own node and a node ID of the destination node. The signal processing includes the process of a DA conversion, encoding according to a predetermined communication protocol, and or like.

The destination determiner 12 acquires reception information from the transmitter/receiver 11 and determines whether or not the destination of the reception information is the own node. In a case where the node ID of the destination node of the reception information is a node ID of the own node, the destination determiner 12 determines that the destination of the reception information is the own node.

The relay information storage 13 temporarily stores the reception information of which the destination is determined to be the own node by the destination determiner 12 as relay information.

The transmission information generator 14 generates transmission information based on the relay information stored in the relay information storage 13. The transmission information is generated by adding information of the number of hops, sensor information, and a node ID of the own node, a node ID of the destination node, and the like to the relay information. The transmission information generated by the transmission information generator 14 is transmitted by the transmitter/receiver 11.

The sleep controller 15 functions regardless of the operating state of the wireless communication apparatus 1 during power inputted thereto. The sleep controller 15 counts a time and controls an operating state, between a sleeping state and a wake-up state, of the wireless communication apparatus 1, based on the time counted, the number of hops of the own node determined by the destination node determiner 16 and the frame information stored in the frame information storage 18.

The sleeping state is a state that the wireless communication apparatus 1 only executes counting of time while it stops an execution of arithmetic operation and a communication function. During the sleeping state, because the transmission/reception of information is not performed, power consumption of the wireless communication apparatus 1 is decreased. Hereinafter, a state that a wireless node is capable of transmitting or receiving of information will be referred to as a wake-up state.

In addition, a transition of the wireless communication apparatus 1 from the wake-up state to the sleeping state will be referred to as "sleep", and a transition from the sleeping state to the wake-up state will be referred to as "wake up".

The destination node determiner 16 determines a destination node of the transmission information based on the reception information received by the transmitter/receiver 11. In the case of the uplink communication, the destination node is a parent node. The destination node determiner 16, for example, determines a wireless node having a highest signal strength of the wireless signal among wireless nodes in which the number of hops of the reception information is smaller than the number of hops of the own node by one as a destination node.

In addition, the destination node determiner 16 determines the number of hops of the own node based on the determined destination node. The destination node determiner 16, for example, determines the destination node by using the method described above and determines the number of hops that is larger than the number of hops of the destination node by one as the number of hops of the own node.

The transmission/reception resource determiner 17 determines a time at which the own node transmits the transmission information based on the frame information. Details thereof will be described later. The frame information may be registered in the wireless communication apparatus 1 in advance or may be registered and updated through wireless communication. A plurality of pieces of the frame information may be registered in advance and may be automatically switched according to the operating time of the wireless communication system or the standard time or the concentrator 2 previously described may notify the whole wireless communication system thereof. In a case where such notification is performed, application start time information is also acquired not only frame information and new frame information is applied based on the time information. The frame information is stored in the frame information storage 13.

The transmission/reception resource determiner 17 may perform a synchronization process before determining the transmission time. Here, the synchronization process is a process of synchronizing time counted by the own node with that of the other wireless nodes.

The transmission/reception resource determiner 17, for example, acquires the transmission time of the transmission source node based on the number of hops and a node ID of the transmission source node and the frame information included in the reception information received by the transmitter/receiver 11. The transmission/reception resource determiner 17 can perform the synchronization process by comparing first time acquired by adding a signal processing time according to the transmitter/receiver 11 of the own node to the transmission time with second time counted by the own node. In the synchronization process, a correction value that is based on a difference between the first time and the second time or a correction value that is based on a result of calculation of frequency drift of a crystal oscillator by a least squares method using a sampled value of the difference of elapsed time for the first time and the second time may be added to or subtracted from the second time. Or a correction value may also be calculated using any other method. In addition, a time required for the propagation of a wireless signal from the transmission source node may be added to or subtracted from the correction value.

Figure 7:
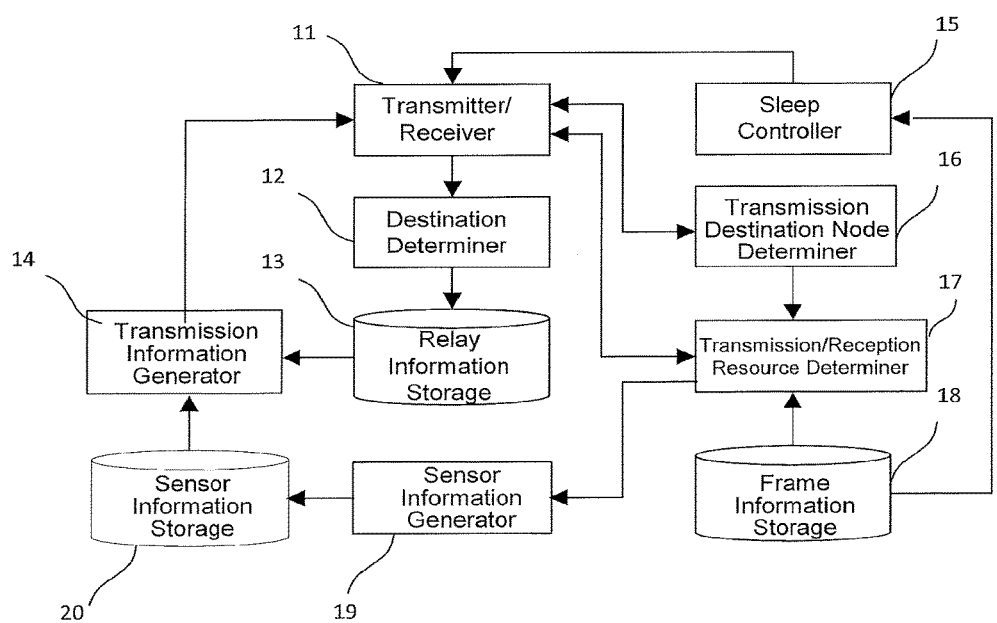
FIG. 7 is a diagram illustrating another configuration of a wireless communication apparatus.

FIG. 7 illustrates a configuration of a wireless communication apparatus in which a sensor is further mounted in the wireless communication apparatus 1 illustrated in FIG. 6, and thereby sensor information is acquired. The wireless communication apparatus further includes a sensor information generator 19 and a sensor information storage 20. The sensor information generator determines timing at which sensor information is acquired by using a transmission slot determined by the transmission/reception resource determiner 17 as the reference. The sensor information generator 19 acquires sensor information from the external sensor device at the timing described above. The sensor information storage 20 stored the sensor information described above. The transmission information generator 14 generates transmission information based on the relay information stored in the relay information storage 13 and the sensor information stored in the sensor information storage 20. The transmission information may be generated by adding information of the number of hops, the sensor information, and the node ID of the own node, the node ID of the destination node, and the like to the relay information. The transmission information generated by the transmission information generator 14 is transmitted by the transmitter/receiver 11. The other functional blocks of the wireless communication apparatus 1 are similar to the blocks of the collector apparatus 2 previously described with reference to FIG. 6. So the description thereof is omitted.

Figure 5:
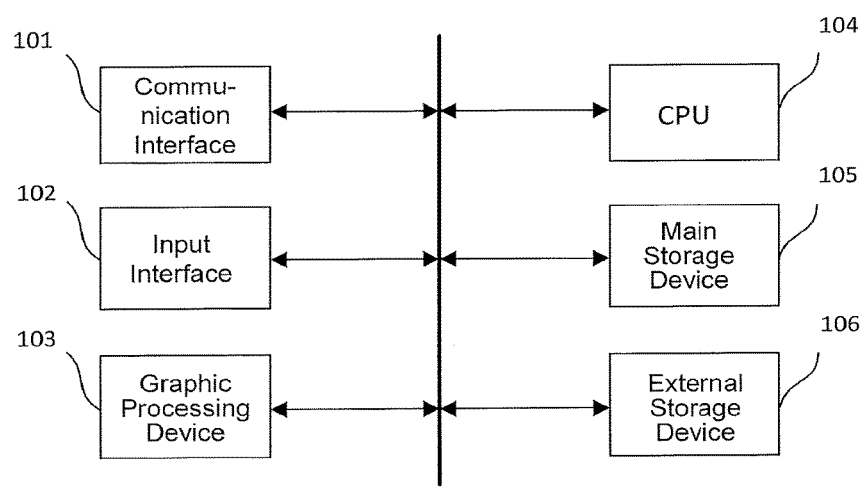
FIG. 5 is a diagram illustrating the hardware configurations of a concentrator and a wireless communication apparatus.

Because a hardware configuration of the wireless communication apparatus 1 is similar to that of the concentrator 2 illustrated in FIG. 5, the description thereof is omitted. In addition, the wireless communication program may be installed to a computer apparatus of the wireless communication apparatus 1 in advance or may be installed to the computer apparatus by transmitting to the wireless communication apparatus 1 via wireless communication.

As the CPU 104 executes the wireless communication program, each functional configuration of the wireless communication apparatus 1 described above can be realized.

<Determination of Transmission Time>

A transmission time allocating method of a wireless node according to this embodiment will be described. A frequency channel used for the transmission may be determined using any method.

<Determination of Transmission Subframe>

The transmission/reception resource determiner 17 selects a subframe based on the number of hops of the own node determined by the destination node determiner, the frame information stored in the frame information storage, and the like.

Figure 8:
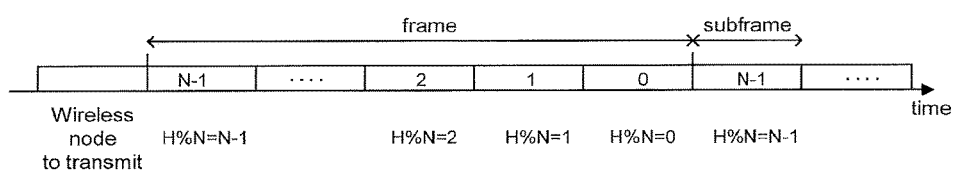
FIG. 8 is a diagram illustrating a relation between a subframe number and the number of hops of a wireless node transmitting information.

FIG. 8 illustrates an example of transmission subframe numbers according to this embodiment and a condition of the number of hops of a wireless node transmitting information. In this embodiment using the uplink communication as the subject, subframe numbers within a frame that are configured by the number N of subframes are allocated starting from (N−1) to "0" in the descending order.

When the number of hops of a wireless node j is denoted by Hj, a transmission subframe number Tj allocated to the wireless node j is represented using Equation (1).

[Numerical Expression 1]

$$Tj = Hj \% N \qquad (1)$$

Here, (A % B) represents a remainder when A is a dividend, and B is a divisor.

<Transmission Timing within Subframe>

The transmission/reception resource determiner 17 transmits information in a subframe allocated for transmission as described above. The subframe may be further divided into slots that are smaller time units. In such a case, the transmission/reception resource determiner 17 may allocate one slot included in a subframe allocated for transmission as a transmission slot.

For example, in a case where a subframe is configured by the number of slots being the same number of wireless nodes or more, and each slot is uniquely allocated without any duplication by a wireless node ID, the transmission/reception resource determiner 17 may transmit information in a slot corresponding to the own node ID within the transmission subframe determined as described above. Or the transmission/reception resource determiner 17 may transmit information in a slot corresponding to a node ID of a child node or a node ID of a generation source node of data that is relayed and transmitted.

Figure 10:
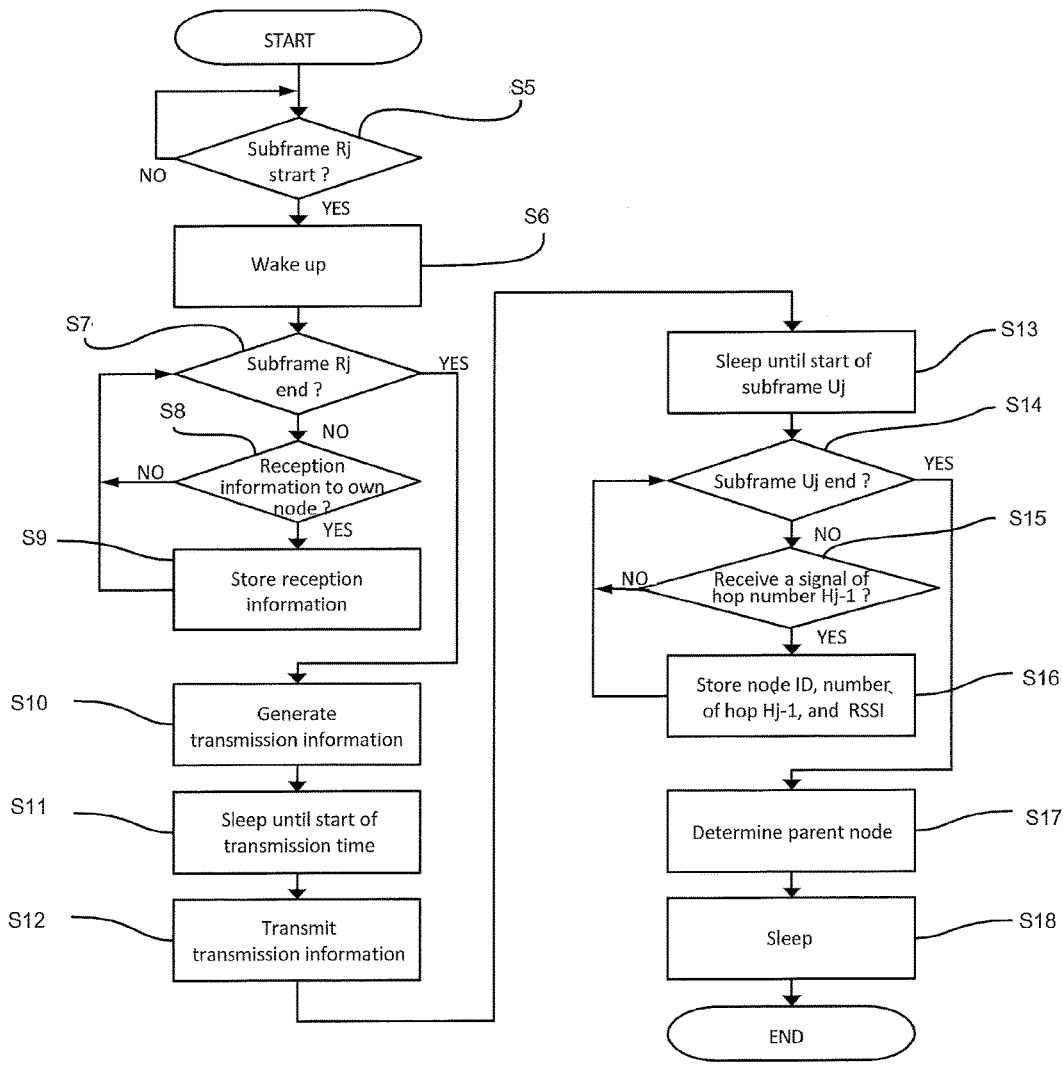
FIG. 10 is a flowchart that illustrates a normal operation of a wireless communication apparatus.

In addition, in a case where a slot is uniquely allocated to a node ID, and in a case where sensing information is generated in step S10 illustrated in FIG. 10, the concentrator can record the generation time of the sensing information included in a reception signal more accurately. More specifically, among frame numbers added by a transmission source of a reception signal, the time of a slot allocated to a node ID can be recorded as the generation time of the sensing information.

On the other hand, in a case where a subframe is not divided into slots, information may be transmitted by using not a multiple access system of a non-contention type described above but by using an access system of a contention type. A representative example of the contention access system includes a carrier sense multiple access with collision avoidance (CSMA/CA).

<Determination of Reception Time of Child Node>

The transmission/reception resource determiner determines a subframe number Rj used for receiving information from a child node. The subframe number Rj may be calculated using Equation (2) as a transmission subframe of a child node by substituting the number Hj of hops represented in Equation (1) with the number (Hj+1) of hops of the child node.

[Numerical Expression 2]

$$Rj = (Hj+1) \% N \qquad (2)$$

However, the method of calculating the child node reception subframe number Rj is not limited to Equation (2), but a method of calculating the child node reception subframe number Rj as a result of the calculation of a remainder acquired by dividing a value acquired by adding one to the transmission subframe number Tj by the number N of subframes or a method of calculating Rj=(Tj+1) when (Tj+1)<N and Rj=0 when (Tj+1)=N may be used. To the contrary, the child node reception subframe number Rj may be calculated first, and the transmission subframe number Tj may be calculated using Rj as the reference.

In a case where a subframe is further divided into slots that are smaller time units, and the slots are further allocated, a slot used for receiving a transmission signal of a child node is determined according to a transmission slot allocation rule. In a case where a plurality of child nodes is present, a slot is determined for each of the child nodes.

Also in a case where a reception time is calculated in time units smaller than the subframes, in a case where the reception state is continuously formed for a transmission subframe period of a child node or a case where transmission is performed using a multiple access system of a non-contention type, the calculation described above does not need to be performed.

<Determination of Reception Time of Parent Node>

The transmission/reception resource determiner may calculate a transmission time of a parent node and receive a transmission signal of the parent node at that time. By receiving a transmission signal of a parent node and referring to the content thereof, it can be checked that a transmission signal of the own node is received by the parent node and is relayed and transmitted to a further upstream side, and it can be used as a determination criterion for performing re-transmission.

The transmission/reception resource determiner 17 determines a subframe number Uj used for receiving the transmission of a parent node. The subframe number Uj may be calculated using Equation (3) as a transmission subframe of a parent node by substituting the number Hj of hops represented in Equation (1) with the number (Hj−1) of hops of the parent node.

[Numerical Expression 3]

$$Uj = (Hj-1) \% N \qquad (3)$$

However, the method of calculating the parent node reception subframe number Uj is not limited to Equation (3), but a method of calculating the parent node reception subframe number Uj as a result of the calculation of a remainder acquired by dividing a value acquired by subtracting one from the transmission subframe number Tj by the number N of subframes or a method of calculating Uj=(Tj−1) when (Tj−1) is zero or more and Uj=(N−1) when (Tj−1)=−1 may be used. To the contrary, the parent node reception subframe number Uj may be calculated first, and the transmission subframe number Tj may be calculated using Uj as the reference or using the child node reception subframe number Rj as the reference.

In a case where a subframe is further divided into slots that are smaller time units, and the slots are further allocated, a slot used for receiving a transmission signal of a parent node is determined according to a transmission slot allocation rule. In a case where a plurality of parent nodes is present, a slot is determined for each of the parent nodes. In addition, in a case where the parent node is a root node, a reception time may be determined using the transmission time of a reference signal transmitted by the root node as the reference without performing the calculation process described above. For example, in a case where a reference signal of the root node is the transmission signal of the parent node, since the reference signal is periodically transmitted, a reception time is determined using a time after a frame period included in the frame information from a time when the reference signal is previously received as the reference.

However, as for the reception time being calculated in time units smaller than the subframes, the calculation does not need to be performed if the reception state is continuously formed during a transmission subframe period of a parent node and if a transmission is performed using a multiple access system of a non-contention type.

<Regarding Connection Reception Time (接続受付時間)>

In addition, a period for connection reception may be arranged. Here, the connection reception is a signal transmitted by a wireless node newly participating in a network to a parent node. The parent node recognizes a child node in accordance with the connection reception, and the reception state can be switched in units of slots.

A subframe for the connection reception, for example, is a subframe that is a previous one of a subframe Rj receiving the transmission signal of a child node, a subframe number Vj for the connection reception may be calculated by following Equation (4) using the number Hj of hops of the own node.

[Numerical Expression 4]

$$Vj = (Hj+2) \% N \qquad (4)$$

The method of calculating the connection reception subframe number Vj is not limited to Equation (4). That is, a result of calculation that applies a remainder acquired by dividing a value of adding two to the transmission subframe number Tj by subframe number N may also be used.

A subframe of the connection reception may be a subframe that is three subframes before Tj or the same subframe as Rj, and a plurality of subframes of the connection reception may possibly be set.

By setting Vj as a subframe earlier than Rj, the reception of a signal of a child node can be started from the frame. By setting a plurality of subframes for the connection reception, the number of child nodes being acceptable of the reception connections per one frame can be increased.

In addition, a dedicated period may be fixedly arranged in all the frames or a part of the frames. The dedicated period may be a predetermined period from the start of the frame, a predetermined period from the end of the frame, or any other predetermined period.

According to the setting of the subframe described above, each wireless node can transmit a transmission signal up to the concentrator in a network delay time of less than (the number H of hops×the number N of subframes) unless there is a communication error.

In addition, in a case where a transmission signal of a parent node is received, although a longer time is required than that of the case of the uplink communication, control information such as the frame information can be transmitted in a downlink direction.

<Specific Example Including Determination of Transmission/Reception Time>
<Initial Operation of Wireless Communication Apparatus>

Figure 9:
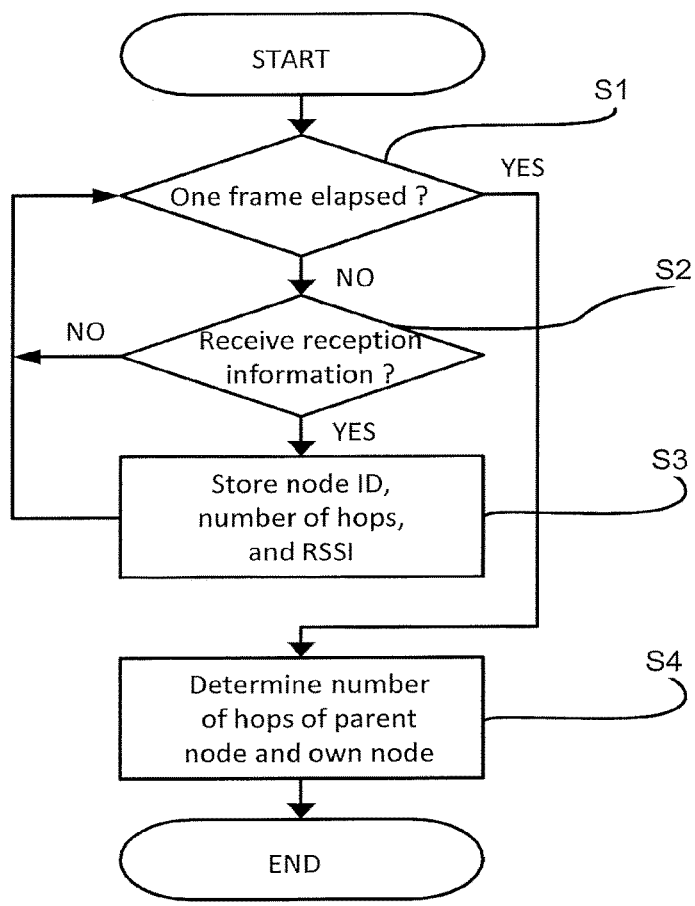
FIG. 9 is a flowchart illustrating an initial operation of a wireless communication apparatus.

Next, the operation of the wireless communication apparatus 1 according to this embodiment will be described. FIG. 9 is an example of a flowchart illustrating the initial operation of the wireless communication apparatus 1, in other words, an operation performed at the time of inputting power. In description presented below, it is assumed that the wireless communication apparatus 1 stores frame information and a node ID in advance.

In step S1, the transmitter/receiver 11 starts a reception process and determines whether or not one frame has elapsed from the input of power. The setting of a frame length immediately after the input of power may be a value different from a setting value of the system that is issued by a concentrator. Until one frame elapses, the transmitter/receiver 11 continues the reception process. The determination performed by the transmitter/receiver 11 is not limited to one frame. In a case where the transmitter/receiver 11 receives reception information (Yes in step S2) before the elapse of one frame (No in step S1), the process proceeds to step S3.

In step S3, the destination node determiner acquires the reception information received by the transmitter/receiver 11 and stores a node ID of the transmission source node of the reception information, the number of hops, and a reception signal strength (RSSI) of the wireless signal (step S3).

The wireless communication apparatus 1 repeats the operations of steps S1 to S3 described above until one frame elapses from the input of power. When one frame elapses (Yes in step S1), the process proceeds to step S4.

In step S4, the destination node determiner 16 determines a destination node (parent node) based on the node ID of the transmission source node, the number of hops, and the reception signal strength of the wireless signal that are stored (step S4). The destination node determiner 16, as described above, may determine a transmission source node having a smallest number of hops and a highest reception signal strength as a destination node (parent node). In addition, the destination node determiner 16 determines the number of hops larger than the number of hops of the destination node (parent node) by one as the number of hops of the own node.

In the description presented above, while the method of determining a destination node is based on the reception signal strength, the method of determining a destination node is not limited thereto. For example, it may be determined that a node having a smaller number of hops is more easily selected as a destination node.

In addition, in a case where available power amount information such as a battery remaining amount of a transmission source node or a power generation amount according to a power supply device is included in the reception information, it may be determined that a node having a larger power amount is more easily selected as the destination node.

Furthermore, in a case where a power consumption amount of a transmission source node or information corresponding thereto is included in the reception information, it may be determined that a node having a smaller power consumption amount is more easily selected as the destination node.

In addition, a destination node may be determined by combining two or more kinds of the information described above, and a destination node may be determined using any method.

In step S4, when a parent node is determined, thereafter, a connection request for the parent node may be performed. In the connection request, information including at least the own node ID is transmitted at the reception time of the parent node.

In addition, in the path from step S1 to step S4, in a case where a condition for performing the parent node determining process is not satisfied, the process may be returned to step S1 again. The condition described above, for example, is that no candidate for a transmission source node that becomes a parent node without reception of information at least once after the elapse of one frame is present or that none of all the transmission source nodes that are received and stored satisfy a criterion of the number of hops or the reception signal strength.

<Normal Operation of Wireless Communication Apparatus>

Figure 11:
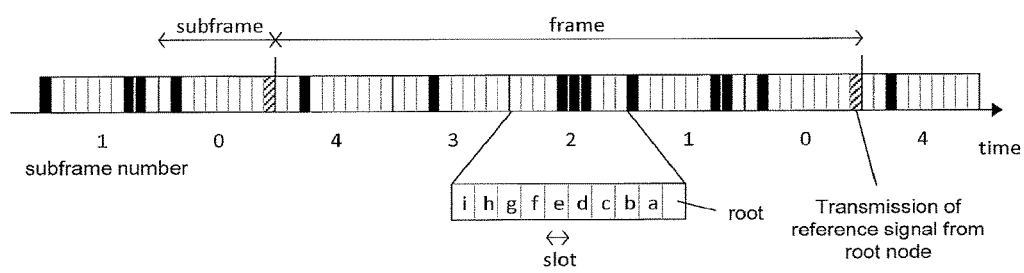
FIG. 11 is a diagram that illustrates an example of a time frame.
Figure 12:
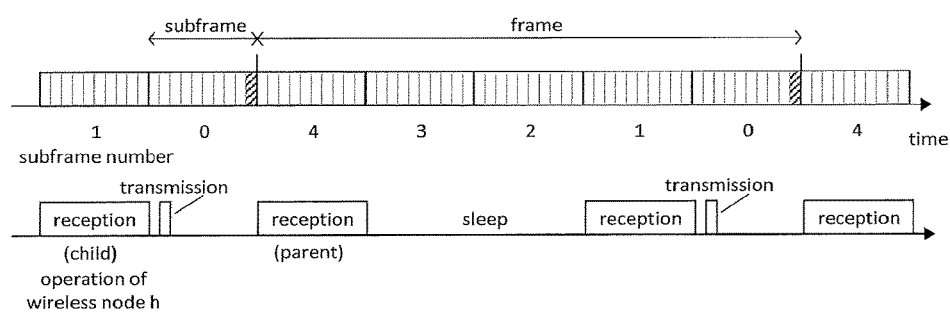
FIG. 12 is a diagram illustrating an example of the operation of a specific wireless communication apparatus in the time frame illustrated in FIG. 11.

Next, the operation of the wireless communication apparatus 1 according to this embodiment will be described with reference to FIG. 10. In addition, FIG. 11 illustrates an example of a case where the number N of subframes=5, and a subframe is configured by 10 slots as a specific example of a time frame. The slots within a sub frame, as illustrated in FIG. 11, are respectively allocated in correspondence with node IDs without any duplication. In the allocation described above, slots in which transmission is performed are colored in black in accordance with the number of hops of each wireless node illustrated in the communication network topology illustrated in FIG. 2. A slot in which a reference signal is transmitted from a root node is shown with hatching in FIG. 11. In addition, as a specific communication network topology and a relay path, those of the example illustrated in FIG. 2 will be assumed for description. FIG. 12 illustrates the operation of a wireless node h of which the number of hops is 5. In this case, the transmission subframe number Tj=0, the child node reception subframe number Rj=1, and the parent node reception subframe number Uj=4.

FIG. 10 is a flowchart illustrating a normal operation of the wireless communication apparatus 1 according to this embodiment that corresponds to one frame. As illustrated in FIG. 10, at the time point of starting the operation, the wireless communication apparatus 1 is assumed to be in a sleeping state. By causing the wireless communication apparatus 1 to be in a sleeping state, the power consumption of the wireless communication apparatus 1 can be decreased.

In step S5, the sleep controller 15 determines whether or not a subframe Rj has started based on a counted time, the number of hops of the own node, and frame information. The sleep controller 15 repeats the determination until the subframe Rj starts (No in step S5). When the subframe Rj starts, the process proceeds to step S6.

In step S6, the sleep controller 15 causes the wireless communication apparatus 1 to wake up. In this way, the transmitter/receiver 11 starts a reception process.

In step S7, the wireless communication apparatus 1 determines whether or not the subframe Rj has ended. Until the subframe ends, the transmitter/receiver 11 continues the reception process.

In step 8, if the transmitter/receiver 11 receives reception information addressed to own node (Yes in step 8) before the subframe ends (No in step S7), the process proceeds to step S9. If not, the process goes back to step 7. Determination of whether the reception information is addressed to own node or whether the destination node of the reception information is own node is performed by the destination determiner 12. In here even if the reception information is not addressed to the own node, in a case where the number of hops of the transmission source node is larger than Hj, the reception information could be received. The relay transmission of a signal not addressed to the own node improves the redundancy of the relay transmission and contributes high reliability of the wireless communication system.

In step S9, the relay information storage 13 stores the reception information addressed to the own node as relay information. The wireless communication apparatus 1 repeats the operations of steps S7 to S9 described above until the subframe Rj ends, thereby receiving the reception information (relay information) of the transmission source node (child node). Then, when the subframe Rj ends (Yes in step S7), the process proceeds to step S10. Here, while a subframe Tj allocated to the number Hj of hops for transmission is described to start simultaneously with the end of the subframe Rj, there may be a period between the subframe Rj and the subframe Tj.

In step S10, the transmission information generator adds information such as a node ID, sensor information, and the number of hops of the own node to the relay information stored in the relay information storage, thereby generating transmission information. After the transmission information generator 14 generates the transmission information, the information stored in the relay information storage 13 may be removed.

In step S10, after the transmission information is generated by the transmission information generator 14, the process proceeds to step S11.

In step S11, the sleep controller 15 causes the wireless communication apparatus 1 to be in the sleeping state until starting of a transmission slot.

Thereafter, in step 12 when the transmission slot starts, the sleep controller 15 wakes up the wireless communication apparatus 1. Thus when the wireless communication apparatus 1 transits to the wake-up state, the transmitter/receiver 11 transmits the transmission information to the destination node (parent node). After the transmission slot ends, the process proceeds to step S13.

In step S13, the sleep controller causes the wireless communication apparatus 1 to be in the sleeping state until starting of subframe Uj. Thereafter, when the subframe Tj ends, and the subframe Uj starts, the sleep controller 15 wakes up the wireless communication apparatus 1. In this way, the transmitter/receiver 11 starts a reception process.

In step S14, the wireless communication apparatus 1 determines whether the subframe Uj has ended. Until the subframe Uj ends, the transmitter/receiver 11 continues the reception process.

In step S15, if the transmitter/receiver 11 receives the transmission information of a wireless node of the number of hops (Hj−1) (Yes in step 15) before the end of the subframe Uj (No in step S14), the process proceeds to next step S16. If not, the process goes back to step 14.

In step S16, the transmission/reception resource determiner 16 stores the number of hops (Hj−1), the node ID, and the reception signal strength (RSSI) of the wireless signal of the transmission source node of the reception information. The wireless communication apparatus 1 repeats the operations of steps S14 to S16 described above until the subframe Uj ends, thereby receiving the transmission information of the destination node (parent node). Then, when the subframe Uj ends (Yes in step S14), the process proceeds to step S17.

In step S17, the destination node determiner 17 determines a destination node (parent node) based on the node ID, the number of hops, and the reception signal strength that are stored. For example, the destination node determiner determines a wireless node having a highest reception signal strength to be the destination node.

According to steps S14 to S17 described above, the destination node (parent node) can be updated to be a wireless node having a maximum reception signal strength for each one frame. Thus, also in a case where a new wireless node is added to the wireless communication system, the wireless communication apparatus 1 can transmit transmission information to an optimal parent node. After the parent node is determined, the wireless communication apparatus 1 is caused to be in the sleeping state (step S18). In a case where the transmission node is not updated, a part of steps S14 to S17 may be omitted.

In addition, in steps S15 and S16, while not illustrated in the drawing, the transmission signal of the parent node is received, and the arrival of the transmission information of the own node may be checked.

This check may be performed based on whether the transmission source node ID among data included in the transmission signal of the parent node matches the node ID of the own node or based on whether a field representing a reception result included in the transmission signal of the parent node is in a reception successful state, and any method may be used. In a case where the arrival of the transmission information of the own node cannot be checked, the transmission signal may be re-transmitted. The retransmission may be performed either at the transmission time of the next frame or another subframe within the same frame.

In step S17, when the destination node (parent node) is updated, the sleep controller causes the wireless communication apparatus 1 to be in the sleeping state. As above, the normal operation of the wireless communication apparatus 1 that corresponds to one frame ends.

While not presented in the description of FIG. 10, the acquisition of the sensor information of the own node may be performed in step S10. In addition, the wireless communication apparatus 1 could be woken up in order to acquire the sensor information.

In the operation of flowchart illustrated in FIG. 10, as illustrated in FIG. 12, while the reception state is continuously formed during the transmission subframe periods of the child node and the parent node, the reception state may be formed only in the transmission slots of the child node and the parent node. In other words, among subframes in which the transmission slots of the child node are included, in slots other than the transmission slots of the child node, the wireless communication apparatus 1 may be caused to be in the sleeping state.

In addition, in a subframe in which the transmission slot of the parent node is included, in slots other than the transmission slot of the parent node, the wireless communication apparatus 1 may be caused to be in the sleeping state.

Figure 13:
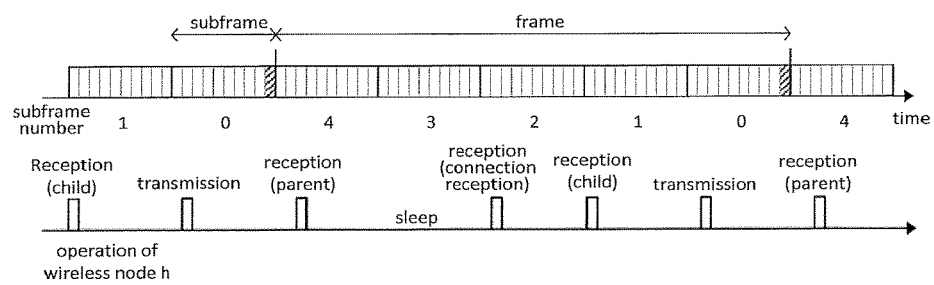
FIG. 13 is a diagram illustrating an example of the operation of a specific wireless communication apparatus in the time frame illustrated in FIG. 11.

In this way, the power consumption can be further decreased. However, in order to specify a transmission slot of a child node, as the child node needs to be identified, accordingly a certain period of time for connection reception thereof should be initially arranged. In the case illustrated in FIG. 13, an example is illustrated in which a reception state is formed for connection reception in a slot, which corresponds to the node ID of the own node, of the subframe number Vj determined in Equation (4).

Figure 14:
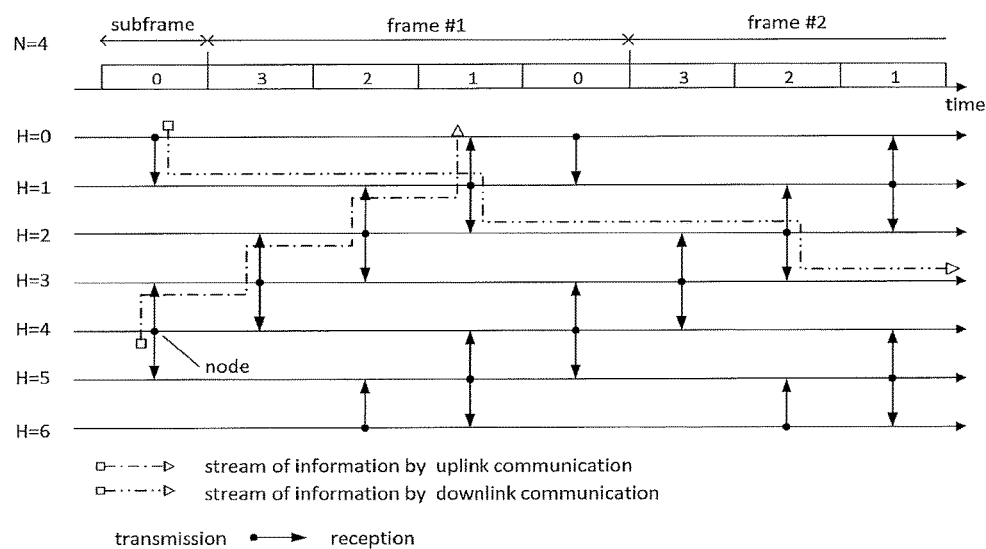
FIG. 14 is a diagram illustrating a schematic relation between another time frame and transmission/reception in each subframe number of a wireless node of each number of hops.

FIG. 14 schematically illustrates a relation of transmission/reception in each subframe number of wireless nodes by each number of hops in a case where the number N of subframes is four (subframe number=3, 2, 1, and 0) and the number of hops is seven (H=0, 1, 2, 3, 4, 5, and 6).

That is, in this figure, dots shows nodes (wireless communication apparatuses 1) or a root (a concentrator 2) as illustrated in FIG. 1 or FIG. 2 and a solid line of arrow shows a transmission from a certain node having a certain number of hops to another nodes or a root having another number of the hops. Thus, another nodes or the root receive information from the certain node.

A dotted line shows examples of uplink communication and downlink communication. One-dot line represents a stream of information by the uplink communication and two-dots line represents a stream of information by the downlink communication.

For example, in a subframe number of "2" of the first frame, a wireless communication apparatus 1 of which the number of hops is "2" and a wireless communication apparatus 1 of which the number of hops is "6" respectively transmit respective information. The information transmitted by the wireless communication apparatus 1 of which the number of hops is "2" is received by the concentrator 2 through a wireless communication apparatus 1 of which the number of hops is "1" within the first frame. On the other hand, the information transmitted by the wireless communication apparatus 1 of which the number of hops is "6" is received by the concentrator 2 in the next second frame. For example, the information transmitted by the wireless communication apparatus 1 of which the number of hops is "6" in the first frame is relayed to a wireless communication apparatus 1 of which the number of hops is "3" in a subframe number of "3", of the second frame. This information is relayed to a wireless communication apparatus 1 of which the number of hops is "1" in a subframe number of "1" of the second frame and finally relayed to the concentrator 2.

In this way, in the first subframe included in the first frame, a first wireless communication apparatus 1 transmits first data, and a second wireless communication apparatus 1 transmits second data. The numbers of hops of the first wireless communication apparatus 1 and the second wireless communication apparatus 1 are different from each other. A third wireless communication apparatus 1 receives the second data of the second wireless communication apparatus 1 in a zeroth subframe of the first frame and transmits the second data in a third subframe of the second frame following after the first frame. The number of hops of the third wireless communication apparatus 1 is different from the numbers of hops of the first wireless communication apparatus 1 and the second wireless communication apparatus 1. For example, the number of hops of the third wireless communication apparatus 1 is larger than the number of hops of the first wireless communication apparatus and is smaller than the number of hops of the second wireless communication apparatus.

A plurality of subframes included in the first frame corresponds to a plurality of subframes included in the second frame with each other. For example, the number of the subframes included in the first frame is the same as that of the subframes included in the second frame.

However, for example, a start timing of the reception in the zeroth subframe of the first frame and a start timing of transmission in the third subframe of the second frame are different from each other. Thus, the third subframe of the second frame does not correspond to the zeroth subframe of the first frame.

The first data is different from the second data. However, the first data and the second data may have a common portion of data in part.

In the information transmitted by the third wireless communication apparatus 1 in the third subframe of the second frame, for example, in addition to the information received from the second wireless communication apparatus 1, other information may be included. The other information, for example, is information generated by the third wireless communication apparatus 1.

The information transmitted by the first wireless communication apparatus in the second subframe of the first frame is received by another wireless communication apparatus included in the wireless communication system or the concentrator 2. The information transmitted by the third wireless communication apparatus in the third subframe of the second frame is received by another wireless communication apparatus included in the wireless communication system or the concentrator 2.

In the first subframe following after the second subframe included in the first frame, a fourth wireless communication apparatus transmits the first data received from the first wireless communication apparatus and a fifth wireless communication apparatus transmits the second data received from the second wireless communication apparatus. The number of hops of the fourth wireless communication apparatus is smaller than the number of hops of the first wireless communication apparatus by one, and the fourth wireless communication apparatus is a parent node of the first wireless communication apparatus. The number of hops of the fifth wireless communication apparatus is smaller than the number of hops of the second wireless communication apparatus by one, and the fifth wireless communication apparatus is a parent node of the second wireless communication apparatus.

In the next zeroth subframe of the first subframe included in the first frame, the concentrator 2 may transmit the information received from the first wireless communication apparatus, and the sixth wireless communication apparatus may transmit the information received from the second wireless communication apparatus.

As a plurality of subframes included in the first frame progresses, the number of hops of the wireless communication apparatus transmitting information is decreased by one each time.

In this embodiment, if the second subframe is a first subframe included in the first frame, the first wireless communication apparatus 1 receives first data and the second wireless communication apparatus 1 receives second data, in a last subframe among a plurality of subframes of a previous one of the first frame. On the other hand, if the second subframe is a second or subsequent subframe (i.e. not the first subframe of the first frame) of the first frame, the first wireless communication apparatus 1 receives first data and the second wireless communication apparatus 1 receives the second data, in a previous subframe of the second subframe of the first frame.

In the case illustrated in FIG. 14, conventionally, while the number of hops of "3" is an upper limit. However, according to this embodiment, the number of hops of "4" or more can be allowed in the wireless communication system. Accordingly, a wireless node (wireless communication apparatus) disposed at a farther position can participates in the network and therefore the cover area of the network can be increased.

FIG. 14 illustrates an appearance in which a transmission signal of a wireless node of which the number of hops is four or more is relayed and transmitted over a frame. A wireless node determining a subframe number "3" as a transmission subframe as a frame start time point maintains a signal to be relayed and transmitted. Since the number N of subframes is four, wireless nodes having a difference in the number of hops to be four determine the same subframe as the transmission subframe.

In this embodiment, the uplink communication is used as the subject, and subframe numbers are assigned in the descending order. Accordingly, the flow of information of the uplink communication smoothly progresses up to the concentrator of H=0, the flow of information of downlink communication progresses by only one hop for each frame.
<Variation in Time Frame>

Figure 15:
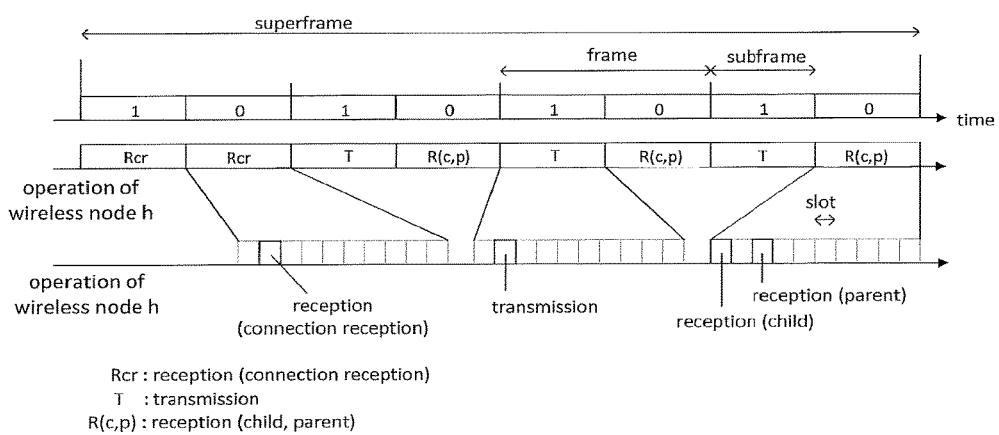
FIG. 15 is a diagram illustrating another time frame and an example of the operation of a specific wireless communication apparatus.

FIG. 15 illustrates an another example in which the number N of subframes in one frame is two according to this embodiment. Here, a node h of which the number H of hops is five (H=5) receives transmission signals from a child node and a parent node in a subframe number "0" and transmits a transmission signal of own node in a subframe number "1".

FIG. 15 illustrates a case where connection reception is performed for every four frames while a sleep operation is performed in units of slots that requires the connection reception. Here, the number of frames for which the connection reception is performed are defined as a superframe. Information of the number of frames in a superframe may be distributed as a part of the frame information or be stored by a wireless device. A child node can determine a frame for connection reception based on a remainder acquired by dividing the frame number by the number of frames. In the example of the connection reception illustrated in FIG. 15, while the wireless node performs the connection reception only in a specific slot, a plurality of wireless nodes may perform reception in all the subframes or in the whole frame, and wireless nodes requesting connections may perform transmission by using a contention access system.

The connection reception may not be performed in a specific frame unlike the description presented above and, for example, may be performed a slot allocated to the root node. Reception for connection reception may be performed in a slot of the root node within a subframe allocated to the transmission of the own node, or reception for connection reception may be performed in a slot of the own node within a subframe denoted by "reception (child/parent)" in FIG. 15 or a slot of the root node of any other subframe. By performing the connection reception without stopping normal transmission/reception, a decrease of a communication capacity can be avoided.

Figure 16:
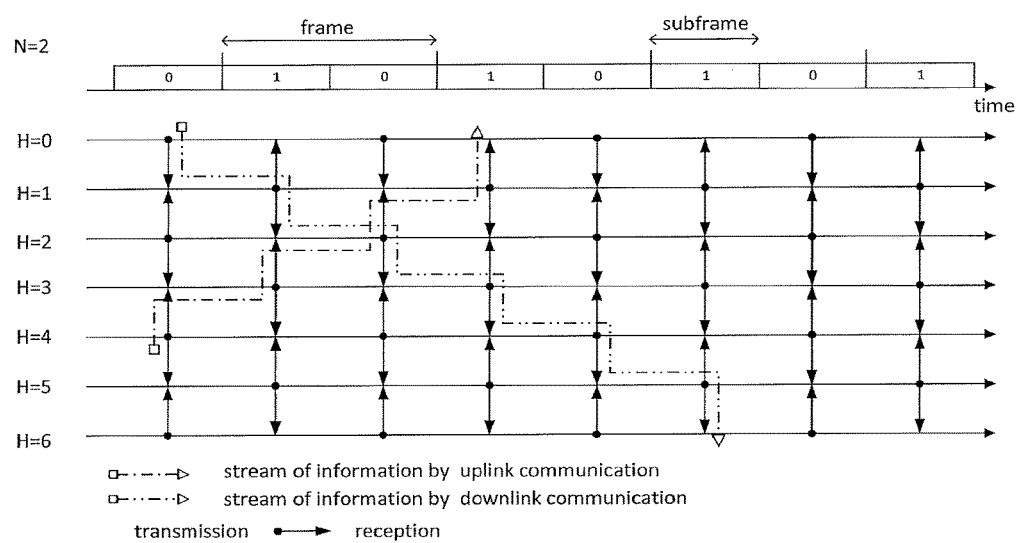
FIG. 16 is a diagram illustrating a schematic relation between the time frame illustrated in FIG. 15 and transmission/reception in each subframe number of a wireless node of each number of hops.

FIG. 16 schematically illustrates a relation of transmission/reception in each subframe number of a wireless node of each number of hops in a case where the number N of subframes is two. The frames of the connection reception illustrated in FIG. 15 are not illustrated. In such case where the number N of subframes is two, network delay times of uplink communication and downlink communication are equal.

Figure 17:
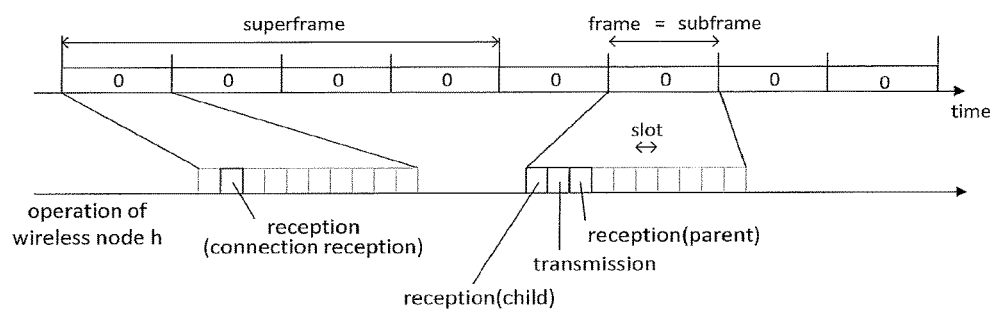
FIG. 17 is a diagram illustrating another time frame and an example of the operation of a specific wireless communication apparatus.

FIG. 17 illustrates an example of a case where the number N of subframes is one as an example of another frame according to this embodiment. At this time, a node h of which the number H of hops is five receives transmission signals of a child node and a parent node in a frame number 0 and transmits a transmission signal of the own node. Similarly to the case illustrated in FIG. 15, FIG. 17 illustrates an appearance in which a superframe of which the number of frames is four is set, and connection reception is performed.

Figure 18:
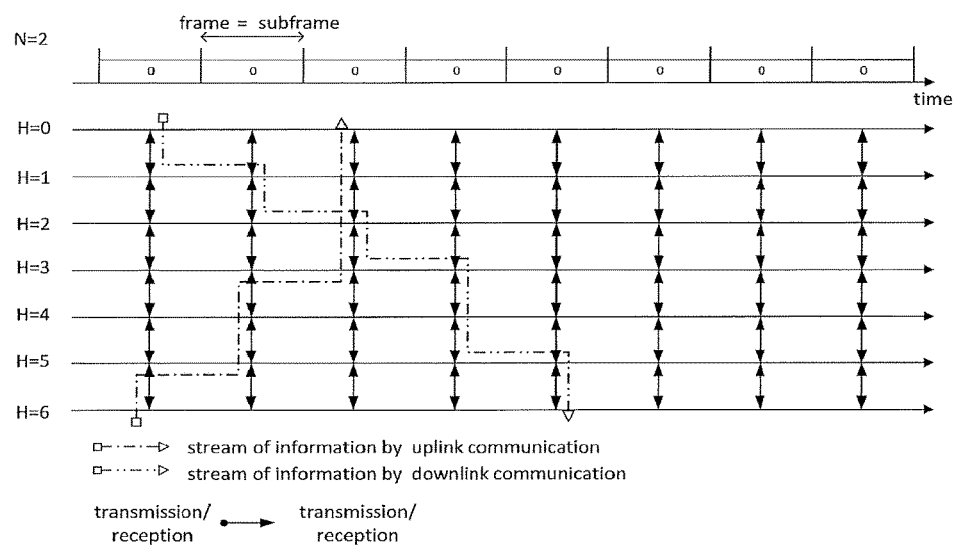
FIG. 18 is a diagram illustrating a schematic relation between the time frame illustrated in FIG. 17 and transmission/reception in each subframe number of a wireless node of each number of hops.

FIG. 18 schematically illustrates a relation of transmission/reception in each subframe number of a wireless node of each number of hops in a case where the number N of subframes is one. The subframes of the connection reception illustrated in FIG. 17 are omitted.

In a case where the number N of subframes is one, since wireless nodes corresponding to all the number of hops perform transmission/reception in each subframe, a network delay of a case where a communication error does not occur is the number N of subframes=2 or less and depends on the transmission time within the subframe. For example, when the transmission time of a child node is earlier than the transmission time of a parent node within a subframe, relay transmission of uplink communication is performed within the same subframe.

On the other hand, when the transmission time of a child node is later than the transmission time of a parent node, relay transmission of uplink communication is performed in a next subframe. In the case of the downlink communication, a reverse relation is formed.

Here, the number of subframes during a transmission period or a frame period for a wireless node can be changed (e.g. N=1, 2 or 4) after a time of system operation or at a time predetermined.

As above, by changing the number N of subframes, the communication frequency of a wireless node can effectively be adjusted, and the system throughput and the power saving can be improved. By setting the number N of subframes to two or less, a network delay of the downlink communication in a wireless communication system having the uplink communication as the subject can be configured to be equal to that of the uplink communication.
<Discarding Process Based on Oldness of Information in Relay Transmission>

While a transmission source node is a wireless node transmitting a transmission signal, a transmission source node is defined as a node generating information.

In a case where the number Hk of hops of the transmission source node is included in the reception information received by the transmitter/receiver, the transmission/reception resource determiner calculates a required network delay frame number L required until information is received by the own node in the wireless communication system by using Equation (5) using the number Hk of hops of the transmission source node, the number Hj of hops of the own node, and the number N of frames.

[Numerical Expression 5]

$$L=\lfloor (Hk-Hj)/N \rfloor \quad (5)$$

In Equation (5), $\lfloor \cdot \rfloor$ represents a floor function. A wireless node may compare a value acquired by subtracting the required network delay frame number L from the current frame number with a generated frame number included in the reception signal and discard the reception information without being set as a relay transmission target in a case where the difference is a predetermined value or more. The difference according to this embodiment corresponds to a total retransmission number of times in a case where retransmission is performed in a next frame. By discarding information of which a total number of times of retransmission is a predetermined number or more, a load applied to the network can be decreased.
<Correspondence to Downlink Communication>

In this embodiment, while the wireless communication system having uplink communication as the subject has been described, the embodiment can be applied also to a wireless communication system having downlink communication as the subject by appending the subframe numbers in the ascending order.

In other words, as illustrated in FIG. 14, the information transmitted by the wireless communication apparatus 1 may be received by a child node together with reception in a parent node. As the wireless communication apparatus 1 transmits information addressed to a child node in addition to information address to a parent node in an allocated subframe. For example, by transmitting information received from a parent node in a certain frame to a child node in the next frame, downlink communication is realized. In the downlink communication, as each frame progresses, the number of hops of the wireless communication apparatus transmitting information is increased by one at each time.

According to this embodiment, a wireless device of which the number of hops is the number of subframes or more can participate in the network, and the cover area can be increased. In addition, by setting the number of subframes to be small, the use efficiency of frequencies is improved, and the system throughput can be improved.

The present invention is not limited to the embodiments described above as they are, but the constituent elements may be changed to be embodied in a range not departing from the concept. In addition, according to an appropriate combination of a plurality of constituent elements disclosed in the embodiments described above, various inventions can be formed. For example, several constituent elements may be removed from all the constituent elements illustrated in the embodiments. Furthermore, constituent elements over mutually-different embodiments may be appropriately combined.

What is claimed is:

1. A wireless communication system comprising:
a concentrator; and
a plurality of wireless communication apparatuses including a first wireless communication apparatus having a first number of hops up to the concentrator, a second wireless communication apparatus having a second number of hops different from the first number of hops up to the concentrator, and a third wireless communication apparatus having a third number of hops different from the first number of hops and the second number of hops up to the concentrator,
wherein, in a first subframe determined from the first number of hops and being among a plurality of subframes included in a first frame period, the first wireless communication apparatus transmits first data, the second wireless communication apparatus transmits second data, and the third wireless communication apparatus receives the second data, and
wherein, in a second subframe determined from the second number of hops and not corresponding to the first subframe among a plurality of subframes included in a second frame period following after the first frame period, the third wireless communication apparatus transmits the second data, and the third wireless communication apparatus does not transmit the second data in the first frame period.

2. The wireless communication system according to claim 1, wherein a difference between the first number of hops and the second number of hops is two or more.

3. The wireless communication system according to claim 2, wherein the third number of hops is larger than the first number of hops and smaller than the second number of hops.

4. The wireless communication system according to claim 1, wherein, in a third subframe following after the first subframe included in the first frame period, a fourth number of hops of a fourth wireless communication apparatus transmitting the first data and a fifth number of hops of a fifth wireless communication apparatus transmitting the second data are respectively smaller than the first number of hops and the second number of hops by one.

5. The wireless communication system according to claim 1, wherein, as one subframe of the plurality of subframes included in the first frame period progresses to the next subframe thereof, the numbers of the hops for the wireless communication apparatuses which transmit the second data and are applied to the subframes are decreased by one.

6. The wireless communication system according to claim 1,
wherein, in a case where the first subframe is a first subframe included in the first frame period, in a last subframe among a plurality of subframes included in a previous frame period of the first frame period, the first wireless communication apparatus receives the first data, and the second wireless communication apparatus receives the second data, and
wherein, in a case where the first subframe is a second or subsequent subframe included in the first frame period, in a previous subframe of the first subframe included in the first frame period, the first wireless communication apparatus receives the first data, and the second wireless communication apparatus receives the second data.

7. The wireless communication system according to claim 1, wherein the number of the subframes during the first frame period and the second frame period for a wireless node is changed after a time of system operation or at a time predetermined.

8. The wireless communication system according to claim 1, wherein each of the first subframes includes a plurality of slots, and a predetermined slot in which the first wireless communication apparatus transmits the first data is different from a predetermined slot in which the second wireless communication apparatus transmits the second data.

9. A wireless communication method of a wireless communication system including:
a concentrator; and
a plurality of wireless communication apparatuses including a first wireless communication apparatus having a first number of hops up to the concentrator, a second wireless communication apparatus having a second number of hops different from the first number of hops up to the concentrator, and a third wireless communication apparatus having a third number of hops different from the first number of hops and the second number of hops up to the concentrator,
wherein, in a first subframe determined from the first number of hops and being among a plurality of subframes included in a first frame period, the first wireless communication apparatus transmits first data, the second wireless communication apparatus transmits second data, and the third wireless communication apparatus receives the second data, and
wherein, in a second subframe determined from the first number of hops and not corresponding to the first subframe among a plurality of subframes included in a second frame period following after the first frame period, the third wireless communication apparatus transmits the second data, and the third wireless communication apparatus does not transmit the second data in the first frame period.

10. A wireless communication system comprising:
a concentrator; and
a plurality of wireless communication apparatuses includes a first wireless communication apparatus having a first number of hops up to the concentrator, a second wireless communication apparatus having a second number of hops up to the concentrator, the second number of hops being different from the first number of hops, and a third wireless communication apparatus having a third number of hops up to the concentrator, the third number of hops being different from the first number of hops and the second number of hops, wherein, in a first subframe determined from the first number of hops and being among a plurality of subframes during a first frame period, the first wireless communication apparatus transmits first data, the second wireless communication apparatus transmits second data, and in a second subframe among the plurality of subframes during the first frame period, the third wireless communication apparatus receives the second data and without transmitting the second data during the first period, and wherein, in a third subframe determined from the first number of hops and being among a plurality of subframes during a second frame period following after the first frame period, the third subframe not corresponding to the first and second subframes in number, the third wireless communication apparatus transmits the second data.

11. The wireless communication system according to claim 10, wherein a difference between the first number of hops and the second number of hops is two or more.

12. The wireless communication system according to claim 11, wherein the third number of hops is larger than the first number of hops and smaller than the second number of hops.

13. The wireless communication system according to claim 12, wherein, in a third subframe following after the first subframe included in the first frame period, a fourth wireless communication apparatus having a fourth number of hops transmits the first data and a fifth wireless communication apparatus having a fifth number of hops transmits the second data, the fourth number of the hops and the fifth number of the hops are respectively smaller than the first number of hops and the second number of hops by one.

14. The wireless communication system according to claim 1, wherein, as a plurality of subframes included in the first frame period progresses, the numbers of hops of the wireless communication apparatuses transmitting the second data in each of the subframes are decreased by one each time.

15. The wireless communication system according to claim 10, wherein, as one subframe of the plurality of subframes included in the first frame period progresses to the next subframe thereof, the numbers of the hops for the wireless communication apparatuses which transmit the second data and are applied to the subframes are decreased by one.

16. The wireless communication system according to claim 10, wherein, in a case where the first subframe is a first subframe included in the first frame period, in a last subframe among a plurality of subframes included in a previous frame period of the first frame period, the first wireless communication apparatus receives the first data, and the second wireless communication apparatus receives the second data, and wherein, in a case where the first subframe is a second or subsequent subframe included in the first frame period, in a previous subframe of the first subframe included in the first frame period, the first wireless communication apparatus receives the first data, and the second wireless communication apparatus receives the second data.

17. The wireless communication system according to claim 10, wherein the number of the subframes during the first frame period and the second frame period for a wireless node is changed after a time of system operation or at a time predetermined.

18. The wireless communication system according to claim 10, wherein each of the first subframes includes a plurality of slots, and a predetermined slot in which the first wireless communication apparatus transmits the first data is different from a predetermined slot in which the second wireless communication apparatus transmits the second data.

* * * * *